United States Patent [19]

Dally et al.

[11] Patent Number: 4,933,933
[45] Date of Patent: Jun. 12, 1990

[54] TORUS ROUTING CHIP

[75] Inventors: William J. Dally, Arlington, Mass.; Charles L. Seitz, San Luis Rey, Calif.

[73] Assignee: The California Institute of Technology, Pasadena, Calif.

[21] Appl. No.: 944,842

[22] Filed: Dec. 19, 1986

[51] Int. Cl.$^5$ .............................................. H04J 3/26
[52] U.S. Cl. .................................. 370/60; 370/85.12
[58] Field of Search ...................... 370/86, 87, 88, 60, 370/94, 61, 89, 29, 85.12; 340/825.01, 825.05, 825.5

[56] References Cited

U.S. PATENT DOCUMENTS

| | | | |
|---|---|---|---|
| 3,748,647 | 7/1973 | Ashany et al. | 370/86 |
| 4,287,592 | 9/1981 | Paulish et al. | 370/94 |
| 4,345,326 | 8/1982 | Dieudonne et al. | 370/60 |
| 4,593,154 | 6/1986 | Takeda et al. | 370/86 |
| 4,598,400 | 7/1986 | Hillis | 370/94 |
| 4,672,373 | 6/1987 | Mori et al. | 370/86 |
| 4,736,465 | 4/1988 | Bobey et al. | 370/88 |
| 4,742,511 | 5/1988 | Johnson | 370/88 |
| 4,763,319 | 8/1988 | Rozenblit | 370/89 |
| 4,797,882 | 1/1989 | Maxemchuk | 370/60 |

Primary Examiner—Douglas W. Olms
Assistant Examiner—Melvin Marcelo
Attorney, Agent, or Firm—Donald A. Streck; Edward O. Ansell; Elgin Edwards

[57] ABSTRACT

A deadlock-free routing system for a plurality of computers ("nodes") is disclosed wherein each physical communication channel in a unidirectional multi-cycle network is split into a group of virtual channels, each channel of which has its own queue, one at each end. Packets of information traversing the same physical channel are assigned a priority as a function of the channel on which a packet arrives and the node to which the packet is destined. The packet's priority is always increasing as it moves closer and closer to its destination. Instead of reading an entire packet into an intermediate processing node before starting transmission to the next node, the routing of this invention forwards every flow control unit (flit) of the packet to the next node as soon as it arrives. The system's network is represented as a dependency graph, which graph is re-ordered to be cycle free. The resulting routing function of the cycle free channel dependency graph is rendered deadlock-free, and the system's cut-through routing results in a reduced message latency when compared under the same conditions to store-and-forward routing.

29 Claims, 6 Drawing Sheets

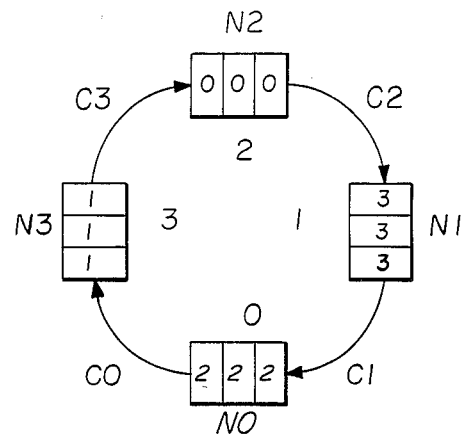
FIG. 1
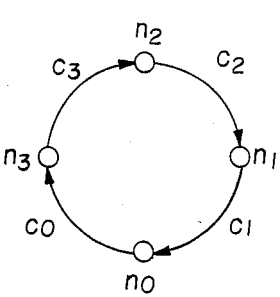
FIG. 2A
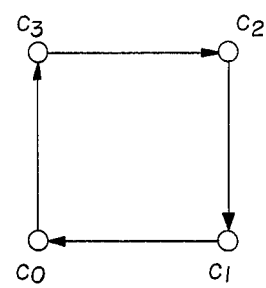
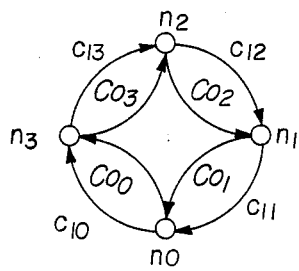
FIG. 2B
COMMUNICATION
NETWORK
I
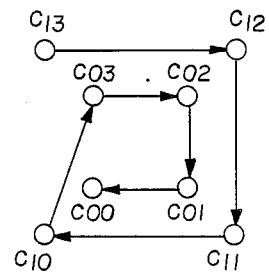
CHANNEL
DEPENDENCY
GRAPH
D

TORUS ROUTING CHIP

ORIGIN OF THE INVENTION

The work leading to the development of this invention reflects the sponsorship of the Navy under ONR Contract No. N00014-79-C-0597.

BACKGROUND OF THE INVENTION

1. Field of the Invention

This invention relates to data movement among concurrent computers ("nodes"), and more particularly to a message passing network which links k-ary n-cube nodes (numbered 0, 1, ..., N−1) together in a k-ary n-dimensional cube in which $N=k^n$ or $n=\log_k N$. Communication channels between nodes terminate in channel switching units located at each node in advance of the node's storage, memory and message processing circuitry.

The field of this invention relates more specifically to a new and improved self-timed channel routing, switching, and deadlock avoidance system in k-ary n-cube multiprocessor networks.

2. Brief Description of the Prior Art

Concurrent computing systems connected in a binary (2-ary) n-cube configuration are disclosed and claimed in applications assigned to the assignee of this application. For example, a concurrent computing system in which individual computers, each with a computational processor and a message-handling processor, are connected as a hypercube is described and claimed in an application entitled "Concurrent Computing System Through Asynchronous Communication Channels," filed on July 12, 1985 as Ser. No. 754,828 and assigned to California Institute of Technology. The identified application is referred to herein as the Seitz et al, Cosmic Cube application. As there described, N nodes (numbered 0, 1, ---- N−1) are connected together with a binary (or Boolean) n-dimensional cube in which $N=2^n$ or $n=\log_2 N$. The nodes are computers comprised of processors and memory, and the nodes communicate with each other by bidirectional communication links only along the edges of the cube. Representative examples of microprocessor hardware and software suitable for performing some of the data transfer features relevant to this invention are fully disclosed in the above-identified application. Specific portions of the Seitz et al Cosmic Cube application are referenced in detail hereinafter.

In an application entitled "Method and Apparatus for Implementing a Maximum-Likelihood Decoder in a Hypercube Network" filed on Sept. 27, 1985 having Ser. No. 781,224 by Fabrizio Pollara-Bozzola, now U.S. Pat. No. 4,730,322 issued Mar. 8, 1988, convolutional codes are decoded by the accumulated metric and survivor steps of the well-known Viterbi algorithm. The improved system divides the decoding operation in parallel among all processors which are assigned unique states of the trellis to compute at different stages on the trellis. In this and the Seitz et al Cosmic Cube application, X, Y, and Z indicate directions of communication in the cube. Each node is assigned a different binary coded identification label, which labels are uniquely ordered in the network. A destination descriptor accompanies each block of data and that destination descriptor is modulo-two added to the local label of a receiving node in order to control message routing.

Similar message routing is employed in another application entitled "Concurrent Hypercube Computing System with Improved Message Passing" filed on Apr. 1, 1986 as Ser. No. 846,721 naming J. C. Peterson et al as inventors. In the latter application separate control channels in addition to bidirectional communication channels link each adjacent node together.

As each of the above-identified applications suggest, the communication time and the amount of communication and control channel wiring involved, are significant factors in the application of concurrent computing to cube-connected systems. Deadlock-free routing is achieved in all of these applications by routing along successive dimensions. Such routing is accomplished by the store and forward approach as therein described.

SUMMARY OF THE INVENTION

A deadlock free routing system invention is disclosed wherein packets which traverse more than one channel have a reduced latency of communication time for this invention as compared to the store-and-forward operational sequence of the above-identified commonly assigned applications. Instead of reading an entire packet into an intermediate processing node before starting transmission to the next node, the routing of this invention forwards each flow control unit (flit) of the packet to the next node as soon as it arrives. This "wormhole" routing results in a reduced message latency when compared under the same conditions to store-and-forward routing.

Another advantage of wormhole routing is that communication does not use up the memory bandwidth of intermediate nodes. A packet does not interact with the processor or memory of intermediate nodes along its route. Packets are moved by self-timed routing elements and remain strictly within the routing network until they reach their destination.

Each physical communication channel in the network is split into a group of virtual channels, each channel of which has its own queue. The group of virtual channels can share the same multiplexed physical communication channel. Packets of information traversing the same node are assigned a route as a function of the channel from which a packet arrives and the node to which the packet is destined. An interconnection network and the routing function are represented as a dependency graph, which graph, in accordance with this invention, is re-ordered to be cycle free. The resulting routing function of the cycle-free channel dependency graph is rendered deadlock free. Deadlock free routing with reduced latency are key features of the apparatus of this invention.

BRIEF DESCRIPTION OF THE DRAWINGS

FIG. 1 depicts deadlock in a 4-cycle network;

FIGS. 2A and 2B are a diagram useful in explaining how deadlock is broken by use of virtual channels in accordance with this invention;

DETAILED DESCRIPTION OF THE DRAWINGS

Figure 3B:
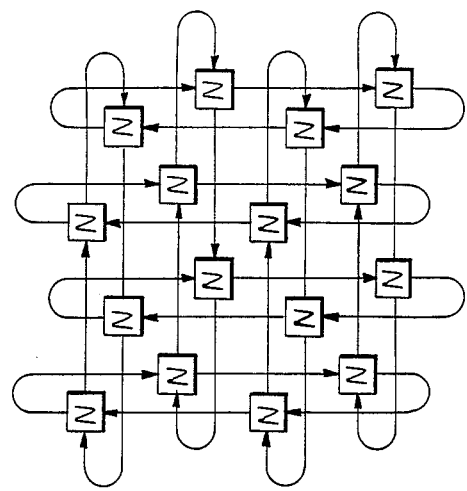
FIGS. 3A and 3B are a network diagram of a unidirectional k-ary, n-cube system where k=4 and n=2.
Figure 3A:
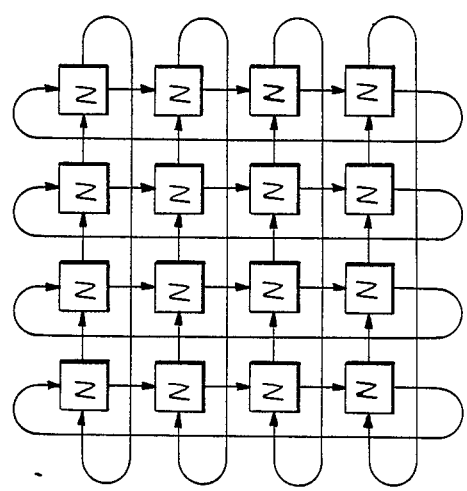

FIG. 1 depicts a deadlock situation in a 4-cycle network. Deadlock, and one feature for avoiding it by an e-cube routing algorithm, is fully defined and described in the aforementioned Seitz et al Cosmic Cube application. Briefly here, however, we present how deadlock occurs when no message in a cycle can advance toward its destination. It is a feature of this invention to provide a deadlock-free network.

Consider the example shown in FIG. 1. The queues 0 of node 0 (N0), 2 of node 2 (N2) etc. of each node in the 4-cycle are filled with messages destined for a node which is located directly opposite from the sending node. Thus queue 0 shows packets destined for node 2, queue 2 has packets for node 0, etc. No message can advance toward its destination because of the intervening nodes. Thus the cycle is deadlocked. In this deadlocked state, no communication can occur over the deadlocked channels until exceptional action is taken to break the deadlock. In the Seitz et al application, all messages are routed by an e-cube routing algorithm in a binary n-cube in which in each dimension a message is always at or one step from its destination; and thus the deadlock cannot exist. Such an approach, however, is a system constraint which is not required in this invention.

The technique of virtual channels allows deadlock-free routing to be performed in any strongly-connected interconnection network. This technique involves splitting physical channels on cycles into multiple virtual channels and then restricting the routing so the dependence between the virtual channels is acyclic. An acyclic graph is one in which all cycles have been removed.

Prior to describing the invention further it is believed helpful to set forth some relevant definitions.

Definition 1. A flow control unit or flit is the smallest unit of information that a virtual channel's queue can accept or refuse. Generally a packet consists of many flits. Each packet carries its own routing information.

We have adopted this additional term to the existing standard terminology in order to distinguish between those flow control units that always include routing information—viz. packets—and those lower level flow control units that do not—viz. flits. The standard discussion on computer networks has been able to avoid this distinction between packets and flits because most networks include routing information with every flow control unit; thus the flow control units are packets. That is not the case in the interconnection networks used by message-passing concurrent computers such as the Cosmic Cube or the networks of this invention. In furtherance of the flit definition assume the following:

1. Every packet arriving at its destination node is eventually consumed.

2. A node can generate packets destined for any other node.

3. The route taken by a packet is determined only by its destination, and not by other traffic in the network.

4. A node can generate packets of arbitrary length. Packets will generally be longer than a single flit.

5. Once a queue accepts the first flit of a packet, it must accept the remainder of the packet before accepting any flits from another packet.

6. Nodes can produce packets at any rate subject to the constraint of available queue space (source queued).

The following additional definitions develop a notation for describing networks, routing functions, and configurations.

Definition 2. An interconnection network, I, is a strongly connected directed graph, I=G(N,C). The vertices of the graph, N, represent the set of processing nodes. The edges of the graph, C, represent the set of communication channels. Associated with each channel, $c_i$, is a queue with capacity $cap(c_i)$. The source node of channel $c_i$ is denoted $s_i$, and the destination node $d_i$.

Definition 3. A routing function R: C×N→C maps the current channel, $c_c$, and destination node, $n_d$, to the next channel, $c_n$, on the route from $c_c$ to $n_d$, $R(c_c,n_d)$ $c_n$. A channel is not allowed to route to itself, $c_c \neq c_n$. Note that this definition restricts the routing to be memoryless in the sense that a packet arriving on channel $c_c$ destined for $n_d$ has no memory of the route that brought it to $c_c$. However, this formulation of routing, as a function from C×N to C, has more memory than the conventional definition of routing which has a function from N×N to C. Making routing dependent on the current channel rather than the current node allows us to develop the feature of channel dependence which is described in greater detail hereinafter. Observe also that the definition of R precludes the route from being dependent on the presence or absence of other traffic in the network. R describes strictly deterministic and non-adaptive routing functions.

Definition 4. A channel dependency graph, D, for a given interconnection network, I, and routing function, R, is a directed graph, D=G(C,E). The vertices of D are the channels of I. The edges of D, are the pairs of channels connected by R:

$$E=\{(c_i,c_j)|R(c_i,n)=c_j \text{ for some } n\epsilon N \}. \tag{1}$$

Since channels are not allowed to route to themselves, there are no 1-cycles in D.

Definition 5. A configuration is an assignment of a subset of N to each queue. The number of flits in the queue for channel $c_i$ will be denoted $size(c_i)$. If the queue for channel $c_i$ contains a flit destined for node $n_d$, then $members(n_d,c_i)$ is true. A configuration is legal if $$\forall c_i \epsilon C, size(c_i) \leq cap(c_i). \tag{2}$$

Definition 6. A deadlocked configuration for a routing function, R, is a non-empty legal configuration of channel queues such that $$\forall c_i \epsilon C, (\text{ } n \forall \text{ member}(n,c_i), n \text{ } d_i \text{ and } c_j=R(c_i,n) \rightarrow size(c_j)=cap(c_j)) \tag{3}$$

In this configuration no flit is one step from its destination, and no flit can advance because the queue for the next channel is full. A routing function, R, is deadlock-free on an interconnection network, I, if no deadlock configuration exists for that function on that network.

Theorem 1 A routing function, R, for an interconnection network, I, is deadlock-free if and only if there are no cycles in the channel dependency graph, D.

Proof:

→Suppose a network has a cycle in D. Since there are no 1-cycles in D, this cycle must be of length two or more. Thus one can construct a deadlocked configuration by filling the queues of each channel in the cycle with flits destined for a node two channels away, where the first channel of the route is along the cycle.

← Suppose a network has no cycles in D. Since D is acyclic one can assign a total order to the channels of C so that if $(c_i, c_j) \epsilon E$ then $c_i > c_j$. Consider the least channel in this order with a full queue, $c_l$. Every channel, $c_n$, that $c_l$ feeds is less than $c_l$, and thus does not have a full queue. Thus, no flit in the queue for $c_l$ is blocked, and one does not have deadlock.

End of Proof.

Having established this if-and-only-if relationship between deadlock and the cycles in the channel dependency graph, a network is deadlock-free by breaking all cycles in the network. To break such cycles, each physical channel along a cycle is split into a group of virtual channels. Each group of virtual channels shares a physical communication channel; and moreover each virtual channel is provided with its own queue.

Consider for example the case of a unidirectional four-cycle shown in FIG. 2A, $N = \}n_0, \ldots, n_3\}$, $C = \{c_0, \ldots, c_3\}$. In FIG. 2A each vertex is shown simply as circle. The interconnection graph I is shown on the left and the dependency graph D is shown on the right. Channel $c_0$ is the dividing channel of the cycle. Each channel is split into a pair of virtual channels with one channel of the pair designated as a high channel and the other designated as a low channel. The high virtual channels are $c_{10}, \ldots c_{13}$, and the low virtual channels, are $c_{00}, \ldots c_{03}$, as shown in FIG. 2B.

In each dimension packets begin on virtual channel 1. A packet remains on virtual channel 1 until it reaches its destination in that dimension or address zero in the direction of routing. After a packet crosses address zero it is routed on virtual channel 0. The address 0 origin of the torus network in X and Y is predetermined by two inputs to the routing circuit. The effect of this routing algorithm is to break the channel dependency cycle in each dimension into a two-turn spiral similar to that shown in FIG. 2B. Packets enter the spiral on the outside turn and reach the inside turn only after passing through address zero.

By definition packets at a node numbered less than their destination node are routed on both types of channels, and packets at a node numbered greater than their destination node are routed exclusively on the low channels. Virtual channel $c_{00}$ is not used. A total ordering of the virtual channels according to their subscripts is defined as: $c_{13} > c_{12} > c_{11} > c_{10} > c_{03} > c_{02} > c_{01}$. Thus, there is no cycle in D, and the routing function is deadlock-free. This technique can be applied in order to construct deadlock-free routing functions for k-ary n-cubes, cube-connected cycles, and shuffle-exchange networks, and in this invention is employed for k-ary n-cubes. In each case virtual channels are added to the network and the routing is restricted to route packets in order of decreasing channel subscripts.

Digressing briefly a further distinction is worthy of note. Many deadlock-free routing algorithms have been developed for store-and-forward computer communications networks. Such algorithms are all based on the concept of a structured buffer pool. The packet buffers in each node of the network are partitioned into classes, and the assignment of buffers to packets is restricted to define a partial order on buffer classes. Both those techniques and the techniques disclosed here prevent deadlock by assigning a partial order to resources. The two operations differ in that the structured buffer pool approach restricts the assignment of buffers to packets while the virtual channel approach restricts the routing of messages. Either can be applied to store-and-forward networks, but the structured buffer pool approach is not applicable to the wormhole networks of this invention since the flits of a packet cannot be interleaved.

Figure 4A:
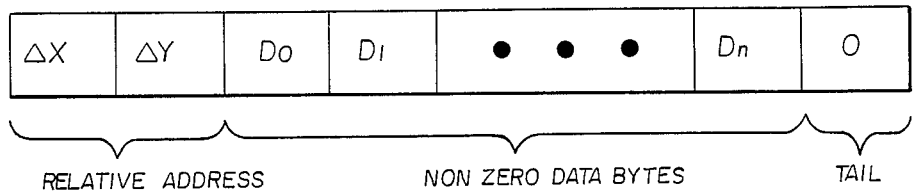
FIGS. 4A, 4B and 4C are a simplified sketch depicting the basic idea and problem solved by this invention.

FIG. 4A shows one possible packet format employed in this invention. The first several bit groups reflect the relative address to which the packet is to be routed. In a two dimensional system that address will require packet movement in an X and then in a Y direction. Thus the packet begins with two address flits. The flits contain the relative, or $\Delta X$ and $\Delta Y$ addresses of the destination node. The relative address in a given direction, say X, is a count of the number of channels that must be traversed in the X direction to reach a node with the same X address as the destination. The same consideration applies to the Y direction. After the address comes the data field of the packet. This field may contain any number of non-zero data bytes. The packet is terminated by a zero tail byte. Extra bits to tag the tail of a packet, and error checking may also be included as desired.

Let us take a flit to be a byte whose 8 bits are transmitted in parallel, although both larger and smaller numbers of bits can be used in each flit. The X and Y channels each consist of 8 data lines and 4 control lines. The 4 control lines are used for separate request/acknowledge signal pairs for each of two virtual channels. The processor channels are also 8 bits wide, but have only two control lines each. Each packet, FIG. 4A, is in turn composed of a sequence of flits. A flit is the basic unit which is queued and acknowledged. Since a flit does not contain routing information, flits cannot be interleaved on a channel. Since each packet, on the other hand, does include routing information, packets can be interleaved on a channel. More information on packet description and message handling may be obtained from the Seitz et al Cosmic Cube application if desired.

Figure 4B:
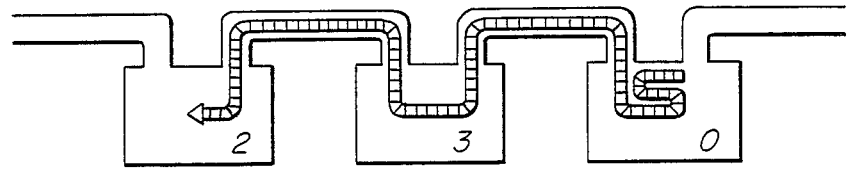

In the routing system of this invention, FIG. 4B, depicts the basic idea of the routing circuit for this invention. Assuming a packet with its sequence of flits is sent from node 0 on the right through node 3 in the middle to node 2 on the left. The routing circuits at each of the node locations are self-timed and operate to forward a packet, or sequence of flits, from node 0 to node 2 by a direct path through node 3. Thus the packet does not enter the memory of node 3 but passes directly through on its way to node 2.

Figure 4C:
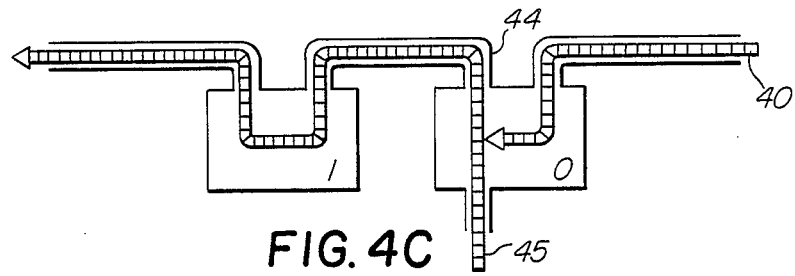

A basic problem solved by this invention is depicted in FIG. 4C wherein the rightmost packet 40 is blocked at node 0 because packet 45 is occupying channel 44. Packet 40 will simply wait until packet 45 is out of channel 44 and then packet 40 may move on to node 1.

This invention routes packets by self-timing and provides deadlock-free packet communications in k-ary n-cube networks, which are also called torus networks. The simplicity of the routing approach lends itself readily and economically to a VLSI chip design. One preferred embodiment with byte-wide unidirectional channels is hereinafter referred to as a torus routing chip or "TRC". While intended primarily for n=2-dimensional networks, the routing circuits can be cascaded to handle n-dimensional networks using [n/2] routing circuits at each processing node. Even if only two dimensions are used, concurrent computers with up to $2^{16}$ nodes can be efficiently operated with this invention. It would be very difficult to distribute a global clock over an array of this size. Self-timing permits each processing node to operate at its own rate without any global synchronization. Synchronization, when required, is performed by arbiters in the torus routing chip. An example of arbitration between packets 40 and 45 is shown in FIG. 4C.

Figure 5:
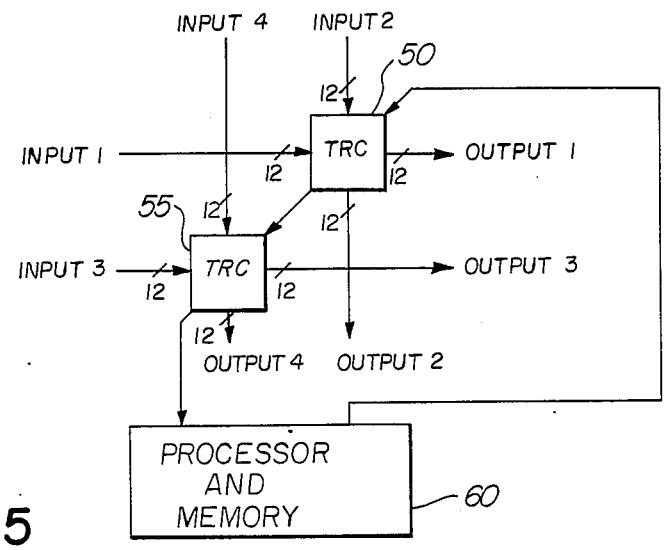
FIG. 5 is a block diagram of the routing network and a local computer system of this invention.

Each TRC routes packets in two dimensions. The chips are cascadable as shown in FIG. 5 to construct networks of dimension greater than two. Up to as many as k=256 processors in each dimension are possible. The first TRC in each node routes packets in the first two dimensions and strips off their address bytes before passing them to the second TRC. This next chip then treats the next two bytes as addresses in the next two dimensions and routes packets accordingly. The network can be extended to any number of dimensions.

Assume in FIG. 5 that a packet which started out with a four-dimensional address enters TRC 50 on input 2. This assumption means that the packet has already been routed to the correct coordinate in the network in the first dimension and thus it has lost its first address flit, and is being routed in the second dimension. If the first current address flit comes in as a zero, the TRC 50 strips the flit and sends the data and tail of the message on to TRC 55 in the same way as it would send the packet to a node. The next two flits of the message contain the routing information for dimensions 3 and 4, so the message is routed by TRC 55 and the corresponding TRC in other nodes to the destination. When the message reaches the destination it is routed from the last TRC 55 in the destination node to the node computer 60.

Each of the physical channels corresponding to inputs and outputs 1, 2, 3, and 4 in FIG. 5 is multiplexed into two virtual channels to prevent deadlock within the cycle formed in a single dimension. A packet remains on virtual channel 1 until it reaches its destination coordinate in that dimension or address zero in the direction of routing. After a packet crosses address zero it is routed on virtual channel 0, thus breaking the channel dependency in this dimension into the two-turn spiral shown in FIG. 2B. Packets enter the spiral on the outside (virtual channel 1) turn and reach the inside (virtual channel 0) only after passing through address zero. The address zero origin of a torus network is most easily determined by two input pins on each TRC, such that they are wired to logic-1 or logic-0 according to whether the TRC is or is not at address zero.

The channels in FIG. 5 from the node computer 60 to TRC 50, from TRC 50 to TRC 55, and from TRC 55 to the node computer 60, use exactly the same format for packets, but do not need to be multiplexed into virtual channels. The prevention of deadlock from one dimension to the next in a k-ary n-cube is assured by the same e-cube algorithm used for binary (2-ary) n-cubes. The e-cube algorithm is described in the aforementioned Seitz et al Cosmic Cube application. In the e-cube algorithm all packets cross successive dimensions of the network consistently in the same predetermined order throughout the system. In FIG. 5 this order is in the numerically ascending order. A packet arriving at its destination in the last dimension—on input 4 in FIG. 5 —, is sent to the node over lead 65, so cannot congest channel 4 indefinitely. A packet arriving at its destination coordinate in dimension 3, which would be on input 3, is either sent to the node or must be sent out on output 4. It cannot be sent out on outputs 1 or 2. Since by the argument above channel 4 cannot be congested indefinitely, it will eventually become available for a message on channel 3, and channel 3 cannot be congested indefinitely either. By this induction we have shown that as long as a message can arrive at the destination coordinate in each dimension, which is assured in the k-ary n-cube by the use of virtual channels within one dimension, the routing between dimensions does not introduce a deadlock either.

Figure 6A:
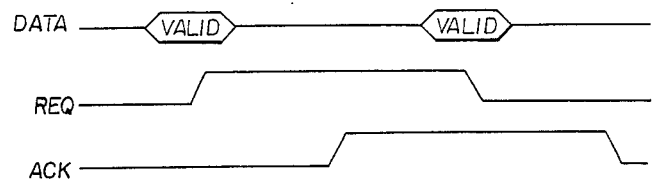
FIGS. 6A and 6B are a diagram of a timing chart useful in describing this invention.

In order to more fully appreciate the self-timed routing of this invention, reference will be made to FIG. 6A. FIG. 6A depicts the timing protocol of a virtual channel. Each virtual channel in the TRC uses the 2-cycle signaling convention shown in FIG. 6A. Each virtual channel has its own request (REQ) and acknowledge (ACK) lines. When REQ=ACK, the receiver is ready for the next flit (byte). To transfer information, the sender waits for REQ=ACK, takes control of the data lines, places data on the data lines, toggles the REQ line, and releases the data lines. The receiver samples data on each transition of the REQ line. When the receiver is ready for the next byte, it toggles the ACK line.

The protocol of FIG. 6A allows both virtual channels to have requests pending. The sending end does not wait for any action from the receiver before releasing the channel. Thus, the other virtual channel will never wait longer than the data transmission time to gain access to the channel. Since a virtual channel always releases the physical channel after transmitting each byte, the arbitration is fair. If both channels are always ready, they alternate bytes on the physical channel.

Figure 6B:
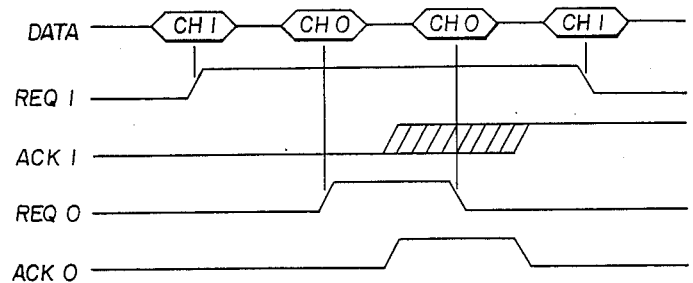

Consider the example shown in FIG. 6B. Virtual Channel CH1 gains control of the physical channel, transmits one byte of information, and releases the channel. Before this information is acknowledged, channel CH0 takes control of the physical channel and transmits two bytes of information. Then CH1, having by then been acknowledged, takes the channel again.

Figure 7:
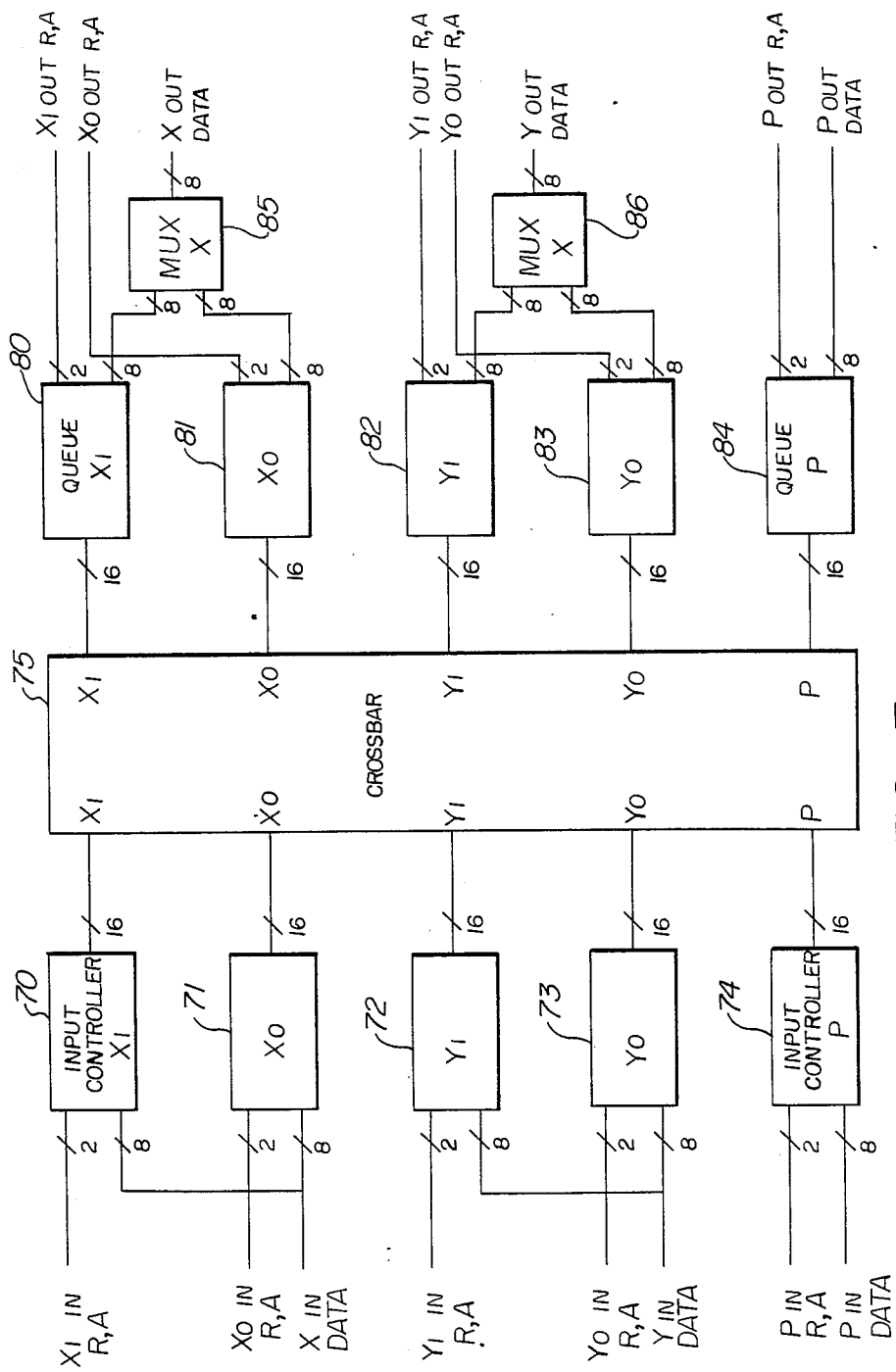
FIG. 7 is a detailed block diagram of one routing circuit of this invention.

As shown in FIG. 7, one form of TRC consists of five input controllers 70 through 74, a five by five crossbar switch 75, five output queues 80 through 84, and two output multiplexers 85, 86. There is one input controller 70, 71, 72, 73, 74 and one output controller 80, 81, 82, 83, 84 for each virtual channel. The output multiplexers such as multiplexer 85 serves to multiplex two virtual channels X0 and X1 onto a single physical channel.

Figure 8:
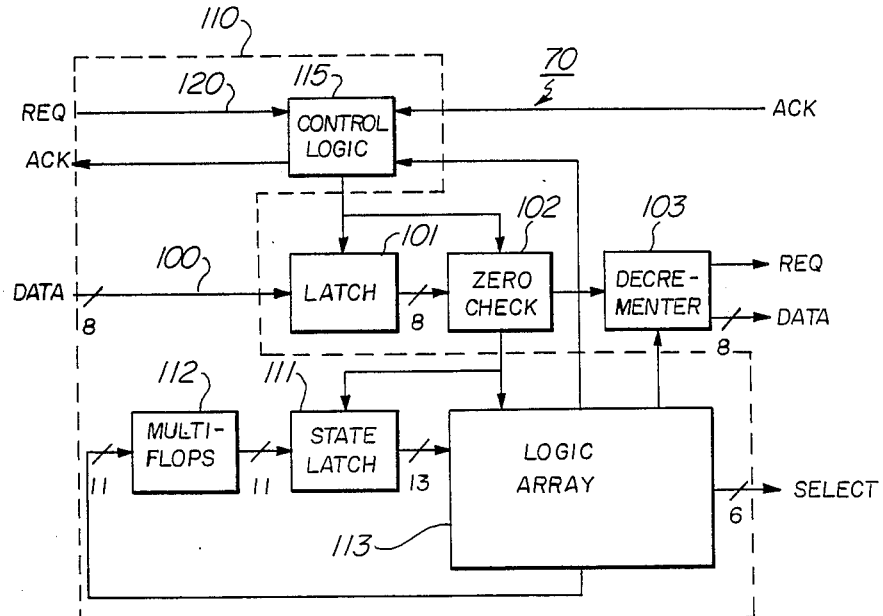
FIG. 8 is a detailed block diagram of an input controller of FIG. 7.

The input controller 70, shown in FIG. 8, consists of a datapath 100 and a self-timed state machine 110. The datapath 100 contains a latch 101, a zero checker 102, and a decrementer 103. A state latch 111, multi-flops 112, logic array 113, and control logic 115 comprise the state machine 110.

The input controller 70 is responsible for packet routing. When a packet header arrives, the input controller 70 selects the output channel, adjusts the header by decrementing and sometimes stripping the byte, and then passes all bytes to the crossbar switch until the tail byte is detected. When the request line 120 for the channel 100 is toggled, data is latched under command of control logic 115 into latch 101, and the zero checker 102 is enabled. When the zero checker 102 makes a decision, the logic array 113 is enabled to determine the next state, the selected crossbar channel, and whether to strip, decrement, or pass the current byte. When the required operation has been completed, possibly requiring a round trip through the crossbar, the state in state latch 111 and selected channel are saved in cross-coupled multi-flops 112 and the logic array 113 is precharged.

The input controller 70 and all other internal logic operates using a well known 4-cycle self-timed signaling convention as described, for example by Seitz, Charles L., in "System Timing", Chapter 7 in Introduction to VLSI Systems, C. A. Mead and L. A. Conway, Addison Wesley, 1980. One function of the state machine 110 and control logic 115 is to convert the external 2-cycle signaling convention into the on-chip 4-cycle signaling convention. The signaling convention is converted back to 2-cycle at the output pads.

Figure 9:
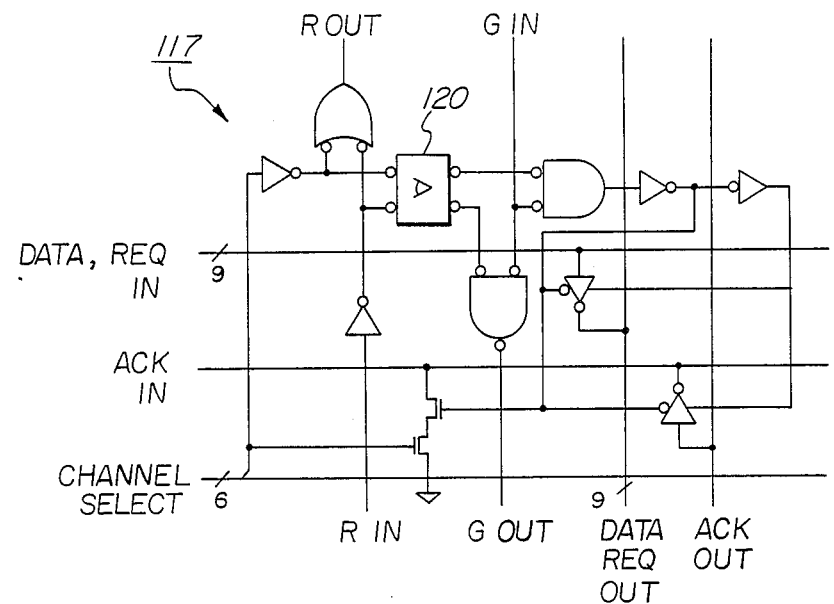
FIG. 9 is a detailed circuit schematic of one crosspoint of a crossbar switch.

The crossbar switch 75, FIG. 7 performs the switching and arbitration required to connect the five input controllers 70-74 through the twenty-five possible connections in switch 75 to the five output queues 80-84. A single crosspoint 117 of the switch 75 is shown in FIG. 9. A two-input interlock (mutual-exclusion) element 120 in each crosspoint arbitrates requests from the current input channel (row) with requests from all lower channels (rows). The interlock elements are connected in a priority chain so that an input channel must win the arbitration in the current row and all higher rows before gaining access to the output channel (column).

The output queues 80-84, FIG. 7 buffer from the crossbar switch 75 for output. The queues 80-84 are each of length four. While a shorter queue would suffice to decouple input and output timing, the longer queue also serves to smooth out the variation in delays due to channel conflicts. Each output multiplexer 85, 86 FIG. 7 performs arbitration and switching for the virtual channels such as X0, X1, that share a common physical channel.

Figure 10:
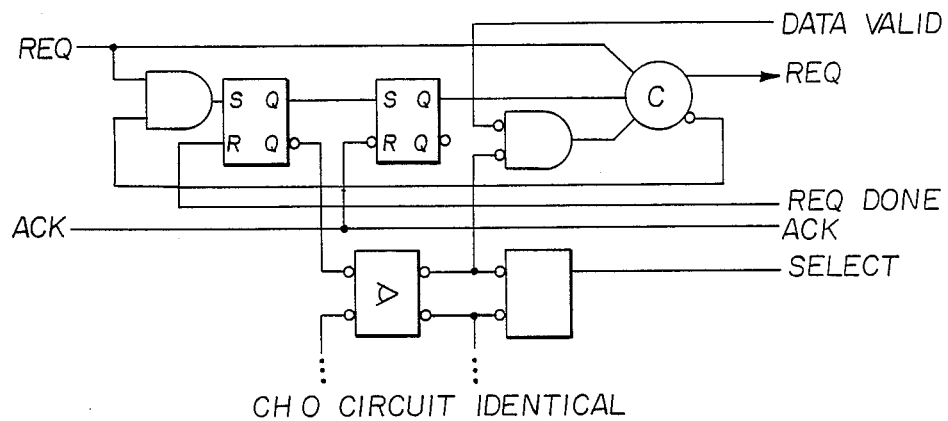
FIG. 10 is a schematic of a multiplexer control as shown in FIG. 7.

As shown in FIG. 10 a small self-timed state machine sequences the events of placing the data on the output pads, asserting request, and removing the output data. To interface the on-chip equipotential region to the off-chip equipotential region that connects adjacent chips, self-timed output pads (FIG. 7.22 in the above-noted textbook) are used. A Schmidt Trigger and exclusive-OR gate in each of these pads signals the state machine when the pad is finished driving the output. These completion signals are used to assure that the data pads are valid before the request is asserted and that the request is valid before the data is removed from the pads and the channel released.

The TRC demonstrates the use of virtual channels to provide deadlock-free wormhole packet routing in k-ary n-cube multiprocessor communication networks. Communication between nodes of a message-passing concurrent computer need not be slower than the communication between the processor and memory of a conventional sequential computer. By using byte-wide datapaths and wormhole routing, the TRC provides node-to-node communication times that approach main memory access times of sequential computers. Communications across the diameter of a network, however, require substantially longer than a memory access time.

There are compelling reasons to use a torus network. First, the torus is easier to wire. Any network topology must be embedded in the plane for implementation. The torus maps naturally into the plane with all wires the same length; the cube maps into the plane in a less uniform way. Second, the torus more evenly distributes the load to the communication channels. When a cube is embedded in the plane, a saturated communication channel may run parallel to an idle channel. In the torus, by grouping these channels together to make fewer but higher bandwidth channels, the saturated channel can use all of the idle channel's capacity. Compare, for example, a 256-node binary 8-cube with a 256-node 16-ary 2-cube (16×16 torus) constructed with the same bisection width. If the 8-cube uses single bit communication channels, 256 wires will pass through a bisection of the cube, 128 in each direction. With the same amount of wire, a torus is constructed with 8-bit wide communication channels. Assuming the channels operate at the same rate—this assumption favors the cube since some of its channels are quite long while the torus channels are uniformly short—the torus network trades a 4-fold increase in diameter (from 8 to 32) for a 8-fold increase in channel throughput. In general, for a $N=2^n$ node computer we trade a $$\frac{2\sqrt[n]{N}}{n}$$

increase in diameter for a $$\frac{\sqrt[n]{N}}{2}$$

increase in channel throughput. Thus the torus provides several commercially compelling reasons why this invention represents a significant breakthrough in message-passing concurrent systems.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. In a k-ary, n-cube communication network interconnecting on first and second dimensions a plurality of concurrently operating computer nodes each including an internal message handling circuitry for handling messages having a destination node identifier, the improved message routing circuitry comprising:
   (a) a physical communication channel forming a cycle between a plurality of the nodes;
   (b) at least a pair of virtual channels sharing said physical channel between each pair of nodes in the plurality with one virtual channel of each pair designated as a high channel and the other virtual channel of each pair designated as a low channel;
   (c) routing means located at each node for routing messages only over said network interconnecting said nodes, said routing means having first and second inputs for receiving messages from the first and second dimensions, respectively, and first and second outputs for outputting continuing messages to the first and second dimensions, respectively; and
   (d) gating means associated with said routing means and responsive to a message reaching its destination node for gating said message out of the network and into the associated node's message handling circuitry.

2. The improvement to a communication network in accordance with claim 1 wherein the nodes are assigned identifying numbers and the messages are formatted into packets each having an identifying number designating the number of the packet's destination node as a packet header and said routing means further comprises:

means for routing packets with a header number at a node numbered less than the packet's destination node exclusively on those virtual channels designated as high channels and packets with a header number at a node numbered greater than the packet's destination node exclusively on those virtual channels designated as low channels.

3. The improvement to a communications network in accordance with claim 2 wherein said routing means further comprises:

means for switching the routing of packets with a header number at a node number equal to the packet's destination in the first dimension from those virtual channels designate as high channels to those channels designated as low channels.

4. The improvement to a communication network in accordance with claim 2 wherein each packet is further defined:

for the two dimension system with X and Y directions of message passing as beginning with two addresses and each address including a relative, or $\Delta X$ and, a relative, or $\Delta Y$ address of the destination node.

5. The improvement to a communication network in accordance with claim 4 and further characterized by:

means at each node for originating a message packet for application to said network, said message packet further defined by the number of intermediate nodes, in both X and Y directions, constituting the X and Y addresses in each originating packet.

6. The improvement to a communications network in accordance with claim 5 and further comprising:

switching means at each node connected between queue storage devices of said virtual channels at that node and responsive to receipt of a packet for decrementing the x or the y addresses of the packet and moving the packet from one of said queue storage devices to another along the network.

7. The improvement to a communication network in accordance with claim 6 wherein said switching means is further characterized by:

means in said switching means for accepting all flits of one packet and continuously routing them along the network once the header of that packet has been accepted at the receiving node.

8. A communication network adaptable for a plurality of concurrently operating computers ("nodes") including at each node an internal message handling circuitry, said network comprising:

a physical communication channel connecting said plurality of nodes in a k-ary, n-cube configuration and forming a physical cycle in at least one dimension, which cycle includes k nodes;

at least a pair of virtual channels sharing said physical channel between each pair of nodes in the cycle;

means in each node for originating messages having a message destination identifier appended to the beginning of a message and indicating a destination for the message to a node other than the originating node;

a message switching circuit connected at each node between the node and the physical communication channel interconnecting the plurality of node;

means in each switching circuit for routing messages only in the network and free of storage in any node intermediate the originating and destination nodes; and means in each node switching circuit responsive to a message's destination identifier when a message reaches a destination node for gating that received message out of the network and into said destination node's internal message handling circuitry.

9. A communication network in accordance with claim 8 and further comprising:

separate control channels for each virtual channel.

10. A communication network in accordance with claim 9 and further comprising:

means at each node connecting the pair of virtual channels and the control channels to the node's message switching circuit.

11. A communication network in accordance with claim 9 and further comprising:

timing means at each virtual channel for transferring messages from one node to another under control of a self-timed two-cycle protocol for the pair of virtual channel control lines.

12. A communication network in accordance with claim 11, and further wherein:

said timing means is self-timed for each virtual channel.

13. A communication network in accordance with claim 11, and further comprising:

one control channel assigned by said timing means as a request ("REQ") channel and another control channel assigned by said timing means as an acknowledge ("ACK") channel.

14. A communication network in accordance with claim 11 wherein each message includes flow control digits ("FLITS") and further wherein:

each message routing means comprises a transmitter and a receiver for routing flits under control of said timing means.

15. A communication network in accordance with claim 14 and further wherein:

said transmitter and receiver at each node includes means for sending and receiving messages according to the ordered method steps of;

(a) sending a flit over a virtual channel when REQ is equal to ACK by:
 1. taking control of the physical line for data transfer;
 2. placing data on the physical line;
 3. toggling the REQ control line; and
 4. releasing the physical data line; and (b) receiving a flit at a receiver by the ordered steps of:
 1. sampling data from the physical line on each transition of a REQ; and
 2. toggling the ACK line when ready to receive the next flit.

16. The improved method of routing messages from an originating node to a destination node in a multicomputer system comprising a plurality of interconnected computer nodes wherein the nodes are connected in a two dimensional array to prevent lockout comprising the steps of:

(a) connecting pairs of nodes between which messages will travel between the originating node and the destination node with a physical communications channel;

(b) switchably connecting each of the nodes to the physical communications channel through first and second virtual channels;

(c) alternately sending messages from one node to a next node over the first and second virtual channels associated with the one node and the next node by time sharing the physical communications channel associated with the one node and the next node;

(d) using the first virtual channel for the transmission of messages between nodes in the first dimension; and, (e) using the second virtual channel for the transmission of messages between nodes in the second dimension.

17. The method of claim 16 and additionally comprising the steps of:

(a) checking a message header associated with messages traveling between nodes in the first dimension at each node; and, (b) switching messages to the second virtual channel at the node where the message header indicates the message has reached its destination in the first dimension.

18. The method of claim 17 and additionally comprising the steps of:

(a) checking the message header associated with messages traveling between nodes in the second dimension at each node; and, (b) removing messages from the second virtual channel at the node where the message header indicates the message has reached its destination in the second dimension and conducting the removed messages to the associated node for processing.

19. The method of claim 17 wherein the message header indicates the location of the destination node as a relative offset in the two dimensions from the originating node and wherein:

said step of checking the message header comprises decrementing the relative offset for the first dimension and checking for a zero condition indicating that the message has arrived at its destination in the first dimension.

20. The method of routing messages from an originating node to a destination node in a multicomputer system comprising a plurality of computer nodes interconnected in at least two dimensions comprising the steps of:

(a) connecting each of the nodes to a first physical communications channel in a first dimension and to a second physical communications channel in a second dimension;

(b) switchably connecting each of the nodes to the first physical communications channel through first and second virtual channels;

(c) switchably connecting each of the nodes to the second physical communications channel through third and fourth virtual channels; and, (d) alternately sending messages from one node to a next node over the first and second virtual channels associated with the one node and the next node by time sharing the physical communications channel associated with the one node and the next node using the first and second virtual channels for the transmission of messages between nodes in he first dimension and using the third and fourth virtual channels for the transmission of messages between nodes in the second dimension;

(e) checking a message header associated with messages traveling between nodes in the first dimension at each node; and, (f) switching messages to the second virtual channel at the node where the message header indicates the message has reached its destination in the first dimension.

21. The method of claim 20 and additionally comprising the steps of:

(a) checking the message header associated with messages traveling between nodes in the second dimension at each node; and, (b) removing messages from the third and fourth virtual channels at the node where the message header indicates the message has reached its destination in the second dimension and conducting the removed messages to the associated node for processing.

22. The method of claim 20 wherein the message header indicates the location of the destination node as a relative offset in the two dimensions from the originating node and wherein:

said step of checking the message header comprises decrementing the relative offset for the first dimension and checking for a zero condition indicating that the message has arrived at its destination in the first dimension.

23. A message routing system for a plurality of concurrent computer nodes connected together with a unidirectional communication channel connecting said nodes in a cycle, said system comprising:

a plurality of unidirectional virtual channels sharing said communication channel, each one of the plurality being terminated by a queue at an end;

means at each node for originating a message packet having a destination node identifier other than the identity of the originating node;

routing means at each queue for modifying each packet identifier as a function of the virtual channel's queue upon which it arrives and the node to which it is destined; and, packet switching means associated with said routing means and responsive to said packet identifiers for restricting the packets to those virtual channels leading to the packet's destination node.

24. A message routing system in accordance with claim 23 and further comprising:

a plurality of nodes connected in a cycle by the communication channel; and at least a pair of virtual channels sharing said communication channel between each pair of nodes in the plurality with one virtual channel of each pair designated as a high channel and the other virtual channel of each pair designated as a low channel.

25. A message routing system in accordance with claim 24 wherein the nodes are assigned identifying numbers, and messages are formatted into packets each having an identifying number designating the number of the packet's destination node as a packet header, and said packet switching means further comprise:

means for exclusively switching packets with a heater number at a node numbered less than the packet's destination node onto only those virtual channels designated as high channels and packets with a header number at a node numbered greater than the packet's destination node onto those virtual channels designated only as low channels.

26. A message routing system in accordance with claim 25, wherein each packet is further defined:
for a two dimension system with X and Y directions of message passing as beginning with two addresses and each address including a relative, or $\Delta X$, address and a relative, or $\Delta Y$, address of the destination node.

27. A message routing system in accordance with claim 26, and further characterized by:
means at each node for originating a message packet for application to said network, said message packet further defined by the number of intermediate nodes, in both X and Y directions, constituting the $\Delta X$ and $\Delta Y$ addresses in each originating packet.

28. A message routing system in accordance with claim 27 and wherein said packet switching means further comprises:
means at each node connected between the queues of two virtual channels at that node and responsive to receipt of a packet for decrementing the $\Delta X$ or the $\Delta Y$ addresses of the packet and moving the packet from one queue to another along the network.

29. A message routing system in accordance with claim 28 wherein each packet includes "flits" which do not contain routing information and wherein said packet switching means is further characterized by:
means for accepting all flits of one packet and continuously routing them along the network once the header of that packet has been accepted at the receiving node.

* * * * *